UNITED STATES PATENT OFFICE.

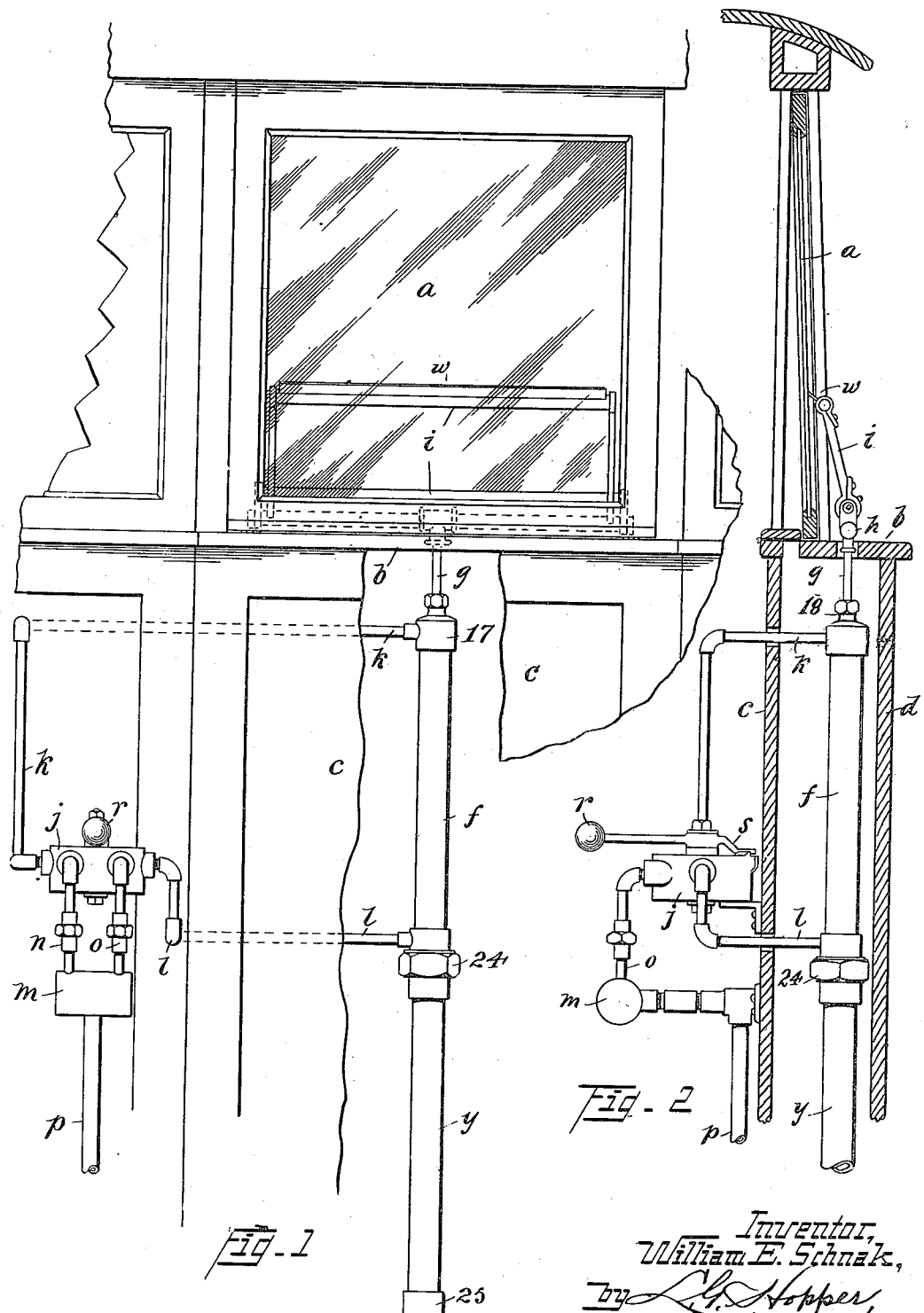

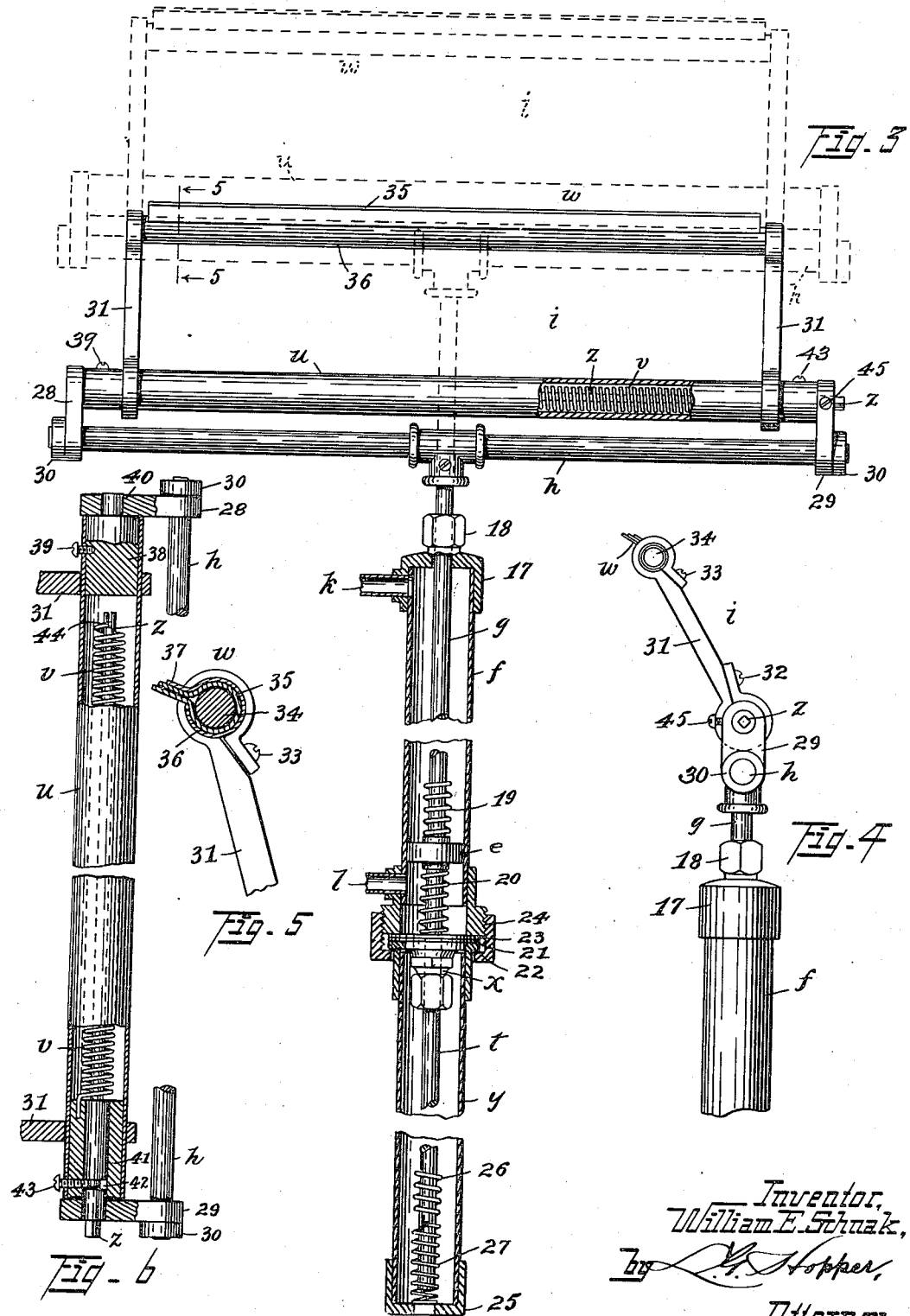

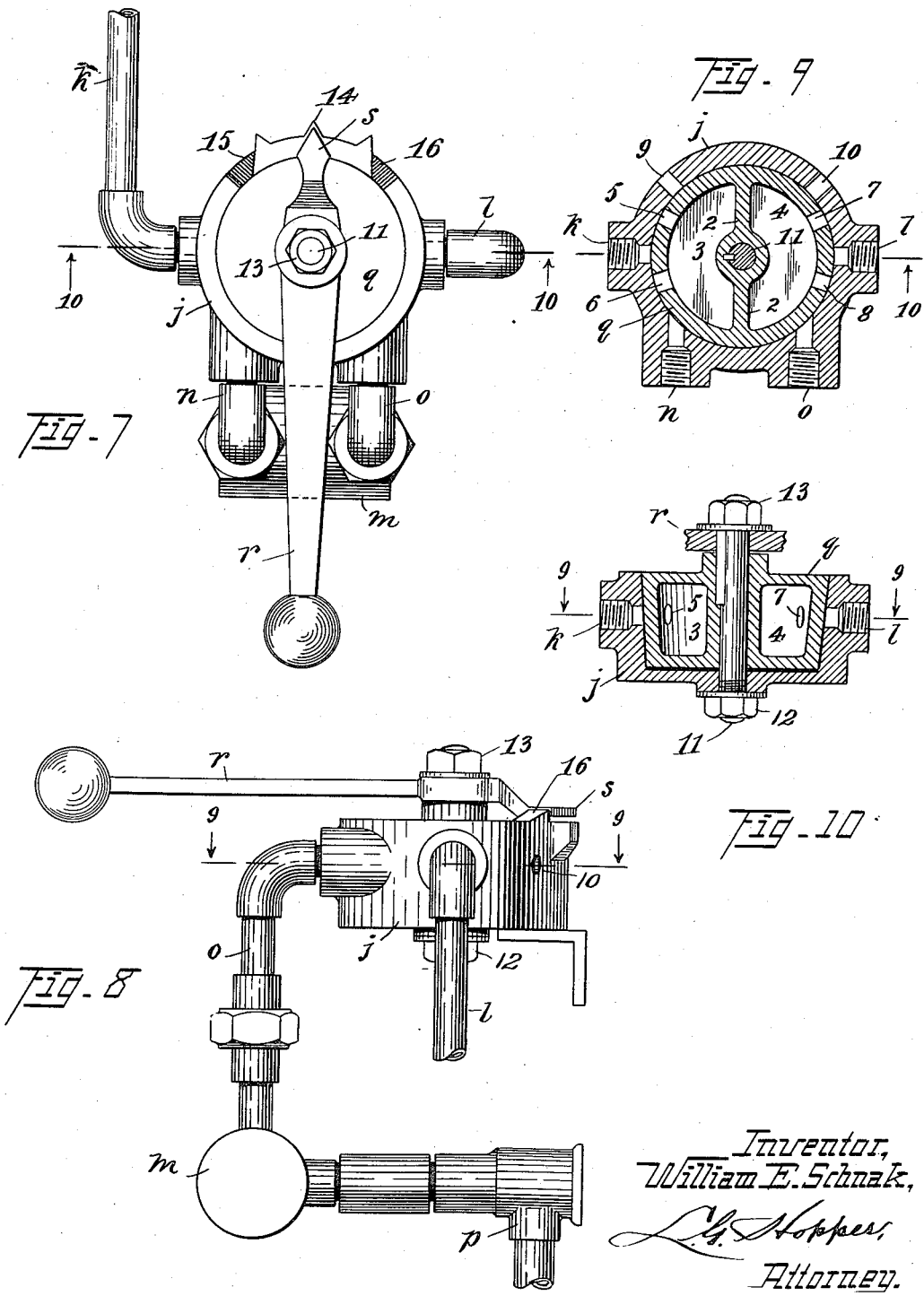

WILLIAM E. SCHNAK, OF CLEVELAND, OHIO.

WINDOW-CLEANER FOR VEHICLES.

1,259,300.  Specification of Letters Patent.  Patented Mar. 12, 1918.

Application filed July 19, 1915. Serial No. 40,655.

*To all whom it may concern:*

Be it known that I, WILLIAM E. SCHNAK, of Cleveland, in the county of Cuyahoga and State of Ohio, have invented new and useful Improvements in Window-Cleaners for Vehicles, of which the following is a specification.

This invention relates to window cleaners, and particularly to means whereby the operator of a vehicle may wipe off the exterior of his outlook pane without leaving or reaching out of his compartment.

My present invention has for its primary object both safety and convenience. As is well known, deposits of snow, rain or dust upon the front windows of moving conveyances render it difficult or impossible for the operators thereof to see ahead; which causes many accidents and delays, especially during storms when frequent wiping of the outside of the glass is necessary. To reach out, or to go outside, to wipe off a window or windshield in stormy weather is very inconvenient and disagreeable; thus such action is often postponed by the operator, creating a condition favorable to the occurrence of serious accidents, which condition my invention is designed to prevent. My cleaner may be installed upon any land vehicle, or ship, or in connection with windows in any other structure to which it may be applied; but it will be especially serviceable in the vestibules of electric railway cars, cabs of locomotives, pilot houses of ships, and upon automobile vehicles. Further objects of the invention relate to details of construction and novel arrangement of apparatus embodying it, which will become apparent from the following description.

Referring now to the accompanying drawings illustrating preferable forms of mechanism,—

Figure 1 is an elevation of the interior front of a car or pilot house, partly broken away, and showing a cleaner installed therein.

Fig. 2 is a side elevation of the same, the car-front being shown in section.

Fig. 3 is a rear side elevation, partly in section, of the cleaner and its operating cylinder; and Fig. 4 is an end view of the upper part of the same.

Fig. 5 is a detailed section taken on line 5—5 of Fig. 3.

Fig. 6 is a detailed view, partly sectioned, showing the pressure spring arrangement for the wiper.

Fig. 7 is a plan view; and

Fig. 8 is an elevation of the operating valve and its connections.

Fig. 9 is a horizontal section of the valve taken on line 9—9 of Fig. 8, or of Fig. 10.

Fig. 10 is a vertical section of the valve taken on line 10—10 of Fig. 7, or of Fig. 9.

In Figs. 1 and 2, showing the apparatus installed in the front end of the usual type of electric railway car, the reference letter $a$ indicates the glass pane of the motorman's outlook window; $b$ is the window-sill; $c$ is the interior, and $d$ the exterior sheathing of the front end of the car. A cylinder $f$ for pressure fluid provided with a piston $e$, and piston-rod $g$, is secured to the car structure above, below, or at one side of the window $a$, but preferably below the window, as shown. The piston-rod $g$ should reciprocate close to and substantially parallel with the outside of the pane $a$; and, while the cylinder $f$ may be exposed, I prefer to house it in, and usually it may be set between inner and outer sheathings $c$ and $d$ with the piston-rod carried up through an aperture in the window-sill $b$, as shown. A cross-bar $h$ has its middle part secured at right angles to the end of the piston-rod $g$, and carries a spring-pressed wiper frame $i$ which will be further described herein.

Any suitable gas or liquid under pressure may be employed to operate the device, but I prefer to use compressed air. The cylinder $f$ has ports at each end connected respectively by small pipes $k$ and $l$ to opposite sides of the shell $j$ of an operating valve. $m$ is a manifold connected to the operating valve by two pipes $n$ and $o$, and supplied through a feed-pipe $p$ with compressed air, or other pressure fluid, from the apparatus usually carried on cars and ships, or specially installed for the purpose.

The operating valve, as shown in Figs. 7, 8, 9 and 10, comprises an open-topped shell $j$ in which is closely but rotatably fitted a hollow conically tapered plug $q$ divided by a transverse partition 2 into two compartments 3 and 4. Alined and spaced to register with the pipe-ports $k$ and $n$ of the shell $j$ are two port-holes 5 and 6 leading through the plug $q$ into the compartment 3; and two similar port-holes 7 and 8 are provided to connect compartment 4 with the pipe-ports $l$ and $o$. Exhaust ports 9 and 10 adapted to register respectively with ports 5 and 7 are bored through the rear of the shell $j$. The valve plug $q$ has the usual central stem 11 rotatably inserted through the bottom of the shell $j$, and screw-threaded for a tightening nut 12. The upper part of the valve-stem is keyed as shown, or otherwise secured against independent rotation, both to the plug $q$ and an operating lever or handle $r$, and a head or nut 13 on the upper end of the stem keeps said handle in place.

An extension of the handle $r$ projects beyond the valve-stem, is offset downward, and terminates in a pointer $s$ sweeping close to the shell $j$. A pointed projection 14 of the shell $j$ serves to indicate a central inoperative position of the valve when the pointer $s$ registers therewith; and a pair of stops 15 and 16, standing up from the shell $j$ the proper distance on either side respectively of said central position, are provided to intercept the tapered sides of the pointer at the wide-open positions of the valve-ports.

The pressure cylinder $f$ is a simple metallic tube having a cap 17 secured upon its upper end, and provided with a stuffing-box 18 for packing the piston-rod $g$. The lower end of the cylinder may be closed by a plain cap if necessary, and buffer springs, such as 19 and 20, provided to intercept and cushion the piston $e$ at each end of its stroke. But in all cases where sufficient space is available I extend the piston-rod through the lower end of the cylinder as shown at $t$, and provide a stuffing-box $x$ for it, whereby the rod is further steadied against the lateral thrust of the wiper frame $i$. To cover and protect the rod $t$, a tube $y$ is provided with an end flange 22, as shown in Fig. 3, a flange 21 of the stuffing-box $x$ is fitted against the tube-flange 22, a packing gasket 23 is inserted to keep the cylinder $f$ tight, and thus the tube $y$, and the stuffing-box $x$ are removably attached to the cylinder $f$ by a screw-threaded pipe-union connection 24. By securing a perforated cap 25 on the lower end of the tube $y$, and slipping coiled springs 26 and 27 over the rod $t$, making one end of each fast thereto, it is obvious that buffer springs may be supplied to coöperate with, or to be substituted in place of the springs 19 and 20.

To carry the wiper-frame $i$, a pair of short arms 28 and 29 are fixedly secured on opposite ends of the cross-rod $h$ in any suitable way, such as by screw-threads and jam-nuts 30, and a spring-tube $u$ having end bearings in said arms is rotatably mounted between them. A pair of wiper-arms 31 are adjustably secured respectively near its ends upon the tube $u$, preferably by strap-clamps, as shown, adapted to be tightened by screws 32. The arms 31 have strap-clamps at their outer ends also with tightening screws 33, wherein the ends of a wiper $w$ may be inserted, adjusted, and made fast.

The wiper $w$ may be of any desired material or construction, but for general use I prefer to employ a form of the well known rubber squeegee cleaner. As plainly shown in Figs. 3, 4 and 5, a round rod 34 has a rectangular piece of sheet rubber material 35 wrapped once about it, and a tubular casing of metal 36 is sprung or slipped over the rubber sheet. The tube 36 is slotted throughout its length, and preferably flanged outwardly on at least one side of its slot as shown at 37, Fig. 5; and the longitudinal edges of the sheet rubber project through the slot and somewhat beyond the outer edge of the flange, so that the elastic and clinging edges of the sheet may rub against the window glass. The projecting edges of the rubber and flange are cut away at the ends of the wiper $w$, so that the latter may be inserted in the end clamps of the arms 31.

In one end of the spring-tube $u$ a bearing plug 38 is secured by a set-screw 39, or otherwise, and has a journal 40 projecting through a bearing in the arm 28. A bushing 41 is closely fitted in the other end of the tube $u$. A steel rod $z$, squared at its outer end for turning it with a wrench or key, is rotatably fitted in the central bore of the bushing 41, and projects out of the bushing to form a journal for the spring-tube $u$ in the arm 29. A groove 42 encircles the rod $z$; and a set-screw 43 is passed through the tube $u$, threaded in the bushing 41, and its inner end projects into the groove 42. A long coiled spring $v$ is fastened at one end to the bushing 41, inserted in the tube $u$, and has its free end bent inward across its diameter as indicated at 44, Fig. 6. The spring-rod $z$ is preferably, though not necessarily, turned to a smaller diameter beyond the bushing 41 as shown, is extended through the spring $v$, and deeply slotted at its inner end to receive and engage the terminal bend 44 of the spring. A set-screw 45, shown in Figs. 3 and 4, is threaded in the arm 29, and engages the rod $z$ to keep the latter from turning when the spring $v$ is adjusted to the proper tension.

The operation of the device is simple. The normal position of the wiper-frame $i$ is at the bottom of the window $a$, as in Figs. 1 and 2. When it is desired to clean the window, the operating valve handle $r$ is first swung to the left from its central position of rest, which opens a passage for pressure fluid from the manifold $m$ through pipe $o$, port 8, compartment 4, port 7, and pipe $l$, to the bottom of the cylinder $f$; causing the piston $e$ to rise until stopped by buffer-spring 19, or 26, or both. At the same time an exhaust passage is opened through the other side of the valve, and out through port 9. As the piston rises it carries up the frame $i$, as shown by dotted lines in Fig. 3, the rubbers of the squeegee $w$ being pressed against the glass $a$ by the spring $v$, and roughly cleaning the window. Then the handle $r$ is swung to the right, which admits pressure through pipe $n$, port 6, chamber 3, port 5, and pipe $k$, to the upper end of the cylinder $f$; and opens an exhaust way through pipe $l$, port 8, chamber 4, port 7, and port 10; thus forcing piston $e$ downward against buffer-spring 20, or 27, or both. As the cleaner $w$ sweeps downward it cleans the window more thoroughly than on its upward stroke, but the cleaner may be reciprocated across the window as many times, and as frequently, as may be necessary to keep the glass clear.

I further point out and distinctly claim as my invention—

1. In a window cleaner, a wiper mounted upon a spring-pressed frame, a power cylinder, a piston in said cylinder connected by a piston-rod to said wiper frame, an extension of said piston-rod through the cylinder-end opposite to said frame, buffer-springs to terminate the stroke of said piston, and a valve for controlling pressure fluid connected in coöperative relation with said cylinder.

2. In a window cleaner, a wiper mounted upon a spring-pressed frame, a power cylinder, a piston in said cylinder connected by a piston-rod to said wiper frame, an extension of said piston-rod adapted to reciprocate through the end of said cylinder opposite to said wiper, a stuffing-box and casing for said rod extension removably attached to said cylinder, and means for controlling a supply of pressure fluid to operate said piston.

3. In a window cleaner, a bracket and means for reciprocating it across a window-pane, a spring-tube rotatably mounted upon said bracket, a spring in said tube tending to rotate the latter, and a cleaning device affixed to a lateral projection of said tube.

4. In a window cleaner, a cross-rod having a pair of removable arms and means for reciprocating it across a window-pane, a spring-tube rotatably mounted in bearings in said arms, a spring in and tending to rotate said tube, a pair of cleaner-arms secured to said tube, and a squeegee cleaner carried by and between the free ends of said cleaner-arms.

5. In a window cleaner, a bracket having parallel arms and means for reciprocating it across a window-pane, a spring-tube rotatably mounted between the arms of said bracket, a coiled spring in and having one of its ends secured to said tube, a rod rotatable axially of said tube and spring, said rod being in winding engagement with the other end of the spring and adjustably secured in an arm of said bracket, and a cleaning device parallel with and bracketed out from said tube.

6. In a window cleaner, a reciprocable bracket having a pair of parallel arms, a spring-tube rotatably journaled at one end in one of said arms, a bushing secured in the other end of said tube, a winding-rod rotatably journaled in said bushing and having a bearing provided with a set-screw in the other arm of said bracket, a spring coiled about and removably engaging said rod at its inner end, the outer end of said spring being secured to said bushing, and a cleaning device bracketed out from said tube.

In testimony whereof I affix my signature in the presence of two subscribing witnesses at Cleveland, Ohio, this 15th day of July, 1915.

WILLIAM E. SCHNAK.

Witnesses:
   RAYMOND B. HOPPER,
   E. WORTHINGTON.